United States Patent
Marash

(10) Patent No.: US 6,483,923 B1
(45) Date of Patent: *Nov. 19, 2002

(54) SYSTEM AND METHOD FOR ADAPTIVE INTERFERENCE CANCELLING

(75) Inventor: Joseph Marash, Haifa (IL)

(73) Assignee: Andrea Electronics Corporation, Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/130,923

(22) Filed: Aug. 6, 1998

Related U.S. Application Data

(63) Continuation of application No. 08/672,899, filed on Jun. 27, 1996, now Pat. No. 5,825,898.

(51) Int. Cl.[7] .............................................. H04R 3/00
(52) U.S. Cl. ...................................................... 381/92
(58) Field of Search ................................................ 381/92

(56) References Cited

U.S. PATENT DOCUMENTS 5,825,898 A * 10/1998 Marash ........................ 381/92

* cited by examiner

Primary Examiner—Forester W. Isen
Assistant Examiner—Elizabeth McChesney
(74) Attorney, Agent, or Firm—Frommer Lawrence & Haug; Thomas J. Kowalski

(57) ABSTRACT

An adaptive system and method for reducing interference in a signal received from an array of sensors. Adaptive filters are used to generate cancelling signals that closely approximate the interference present in the received signal. The adaptive filter weights are converted into the frequency domain where the frequency representation values in a selected frequency range are truncated to avoid signal leakage involving narrow band signals. Deodorizing filters are used to produce the cancelling signals having a flat frequency spectrum. Normalized power difference is used limit the operation of the adaptive filters to the case where there is some directional interference to be eliminated.

16 Claims, 15 Drawing Sheets

SYSTEM AND METHOD FOR ADAPTIVE INTERFERENCE CANCELLING

This application is a continuation of Ser. No. 08/672,889 filed Jun. 27, 1996, now U.S. Pat. No. 5,825,898, issued Oct. 20, 1998.

BACKGROUND OF THE INVENTION

The present invention relates generally to signal processing, and more specifically to an adaptive signal processing system and method for reducing interference in a received signal.

There are many instances where it is desirable to have a sensor capable of receiving an information signal from a particular signal source where the environment includes sources of interference signals at locations different from that of the signal source. One such instance is the use of microphones to record a particular party's speech in a room where there are other parties speaking simultaneously, causing interference in the received signals.

If one knows the exact characteristics of the interference, one can use a fixed-weight filter to suppress it. But it is often difficult to predict the exact characteristics of the interference because they may vary according to changes in the interference sources, the background noise, acoustic environment, orientation of the sensor with respect to the signal source, the transmission paths from the signal source to the sensor, and many other factors. Therefore, in order to suppress such interference, an adaptive system that can change its own parameters in response to a changing environment is needed.

An adaptive filter is an adaptive system that can change its own filtering characteristics in order to produce a desired response. Typically, the filter weights defining the characteristics of an adaptive filter are continuously updated so that the difference between a signal representing a desired response and an output signal of the adaptive filter is minimized.

The use of adaptive filters for reducing interference in a received signal has been known in the art as adaptive noise cancelling. It is based on the idea of cancelling a noise component of a received signal from the direction of a signal source by sampling the noise independently of the source signal and modifying the sampled noise to approximate the noise component in the received signal using an adaptive filter. For a seminal article on adaptive noise cancelling, see B. Widrow et al., Adaptive Noise Cancelling: Principles and Applications, Proc. IEEE 63:1692–1716, 1975.

A basic configuration for adaptive noise cancelling has a primary input received by a microphone directed to a desired signal source and a reference input received independently by another microphone directed to a noise source. The primary input contains both a source signal component originating from the signal source and a noise component originating from the noise source. The noise component is different from the reference input representing the noise source itself because the noise signal must travel from the noise source to the signal source in order to be included as the noise component.

The noise component, however, is likely to have some correlation with the reference input because both of them originate from the same noise source. Thus, a filter can be used to filter the reference input to generate a cancelling signal approximating the noise component. The adaptive filter does this dynamically by generating an output signal which is the difference between the primary input and the cancelling signal, and by adjusting its filter weights to minimize the mean-square value of the output signal. When the filter weights settle, the output signal effectively replicates the source signal substantially free of the noise component because the cancelling signal closely tracks the noise component.

Adaptive noise cancelling can be combined with beamforming, a known technique of using an array of sensors to improve reception of signals coming from a specific direction. A beamformer is a spatial filter that generates a single channel from multiple channels received through multiple sensors by filtering the individual multiple channels and combining them in such a way as to extract signals coming from a specific direction. Thus, a beamformer can change the direction of receiving sensitivity without physically moving the array of sensors. For details on beamforming, see B. D. Van Veen and K. M. Buckley, Beamforming: Versatile Approach to Spatial Filtering, IEEE ASSP Mag. 5(2), 4–24.

Since the beamformer can effectively be pointed in many directions without physically moving its sensors, the beamformer can be combined with adaptive noise cancelling to form an adaptive beamformer that can suppress specific directional interference rather than general background noise. The beamformer can provide the primary input by spatially filtering input signals from an array of sensors so that its output represents a signal received in the direction of a signal source. Similarly, the beamformer can provide the reference input by spatially filtering the sensor signals so that the output represents a signal received in the direction of interference sources. For a seminal article on adaptive beamformers, see L. J. Griffiths & C. W. Jim, An Alternative Approach to Linearly Constrained Adaptive Beamforming, IEEE Trans. Ant. Prop. AP-30:27–34, 1982.

One problem with a conventional adaptive beamformer is that its output characteristics change depending on input frequencies and sensor directions with respect to interference sources. This is due to the sensitivity of a beamformer to different input frequencies and sensor directions. A uniform output behavior of a system over all input frequencies of interest and over all sensor directions is clearly desirable in a directional microphone system where faithful reproduction of a sound signal is required regardless of where the microphones are located.

Another problem with adaptive beamforming is "signal leakage". Adaptive noise cancelling is based on an assumption that the reference input representing noise sources is uncorrelated with the source signal component in the primary input, meaning that the reference input should not contain the source signal. But this "signal free" reference input assumption is violated in any real environment. Any mismatch in the microphones (amplitude or phase) or their related analog front end, any reverberation caused by the surroundings or a mechanical structure, and even any mechanical coupling in the physical microphone structure will likely cause "signal leakage" from the signal source into the reference input. If there is any correlation between the reference input and the source signal component in the primary input, the adaptation process by the adaptive filter causes cancellation of the source signal component, resulting in distortion and degradation in performance.

It is also important to confine the adaptation process to the case where there is at least some directional interference to be eliminated. Since nondirectional noise, such as wind noise or vibration noise induced by the mechanical structure of the system, is typically uncorrelated with the noise component of the received signal, the adaptive filter cannot generate a cancelling signal approximating the noise component.

Prior art suggests inhibiting the adaptation process of an adaptive filter when the signal-to-noise ratio (SNR) is high based on the observation that a strong source signal tends to leak into the reference input. For example, U.S. Pat. No. 4,956,867 describes the use of cross-correlation between two sensors to inhibit the adaptation process when the SNR is high.

But the prior art approach fails to consider the effect of directional interference because the SNR-based approach considers only nondirectional noise. Since nondirectional noise is not correlated to the noise component of the received signal, the adaptation process searches in vain for new filter weights, which often results in cancelling the source signal component of the received signal.

The prior art approach also fails to consider signal leakage when the source signal is of a narrow bandwidth. In a directional microphone application, the source signal often contains a narrow band signal, such as speech signal, with its power spectral density concentrated in a narrow frequency range. When signal leakage occurs due to a strong narrow band signal, the prior art approach may not inhibit the adaptation process because the overall signal strength of such narrow band signal may not high enough. The source signal component of the received signal is cancelled as a result, and if the source signal is a speech signal, degradation in speech intelligibility occurs.

Therefore, there exists a need for an adaptive system that can suppress directional interference in a received signal with a uniform frequency behavior over a wide angular distribution of interference sources.

SUMMARY OF THE INVENTION

Accordingly, it is an object of the present invention to suppress interference in a received signal using an adaptive filter for processing inputs from an array of sensors.

Another object of the invention is to limit the adaptation process of such adaptive filter to the case where there is at least some directional interference to be eliminated.

A further object of the invention is to control the adaptation process to prevent signal leakage for narrow band signals.

Another object is to produce an output with a uniform frequency behavior in all directions from the sensor array.

These and other objects are achieved in accordance with the present invention, which uses a system for processing digital data representing signals received from an array of sensors. The system includes a main channel matrix unit for generating a main channel representing signals received in the direction of a signal source where the main channel has a source signal component and an interference signal component. The system includes a reference channel matrix unit for generating at least one reference channel where each reference channel represents signals received in directions other than that of the signal source. The system uses adaptive filters for generating cancelling signals approximating the interference signal component of the main channel and a difference unit for generating a digital output signal by subtracting the cancelling signals from the main channel. Each adaptive filter has weight updating means for finding new filter weights based on the output signal. The system includes weight constraining means for truncating the new filter weight values to predetermined threshold values when each of the new filter weight value exceeds the corresponding threshold value.

The system may further include at least one decolorizing filter for generating a flat-frequency reference channel. The system may further include inhibiting means for estimating the power of the main channel and the power of the reference channels and for generating an inhibit signal to the weight updating means based on normalized power difference between the main channel and the reference channels.

The system produces an output substantially free of directional interference with a uniform frequency behavior in all directions from the system.

The objects are also achieved in accordance with the present invention using a method, which can readily be implemented in a program controlling a commercially available DSP processor.

BRIEF DESCRIPTION OF THE DRAWINGS

The objects, features and advantages of the present invention will be more readily apparent from the following detailed description of the invention in which.

DETAILED DESCRIPTION OF THE INVENTION

Figure 1:
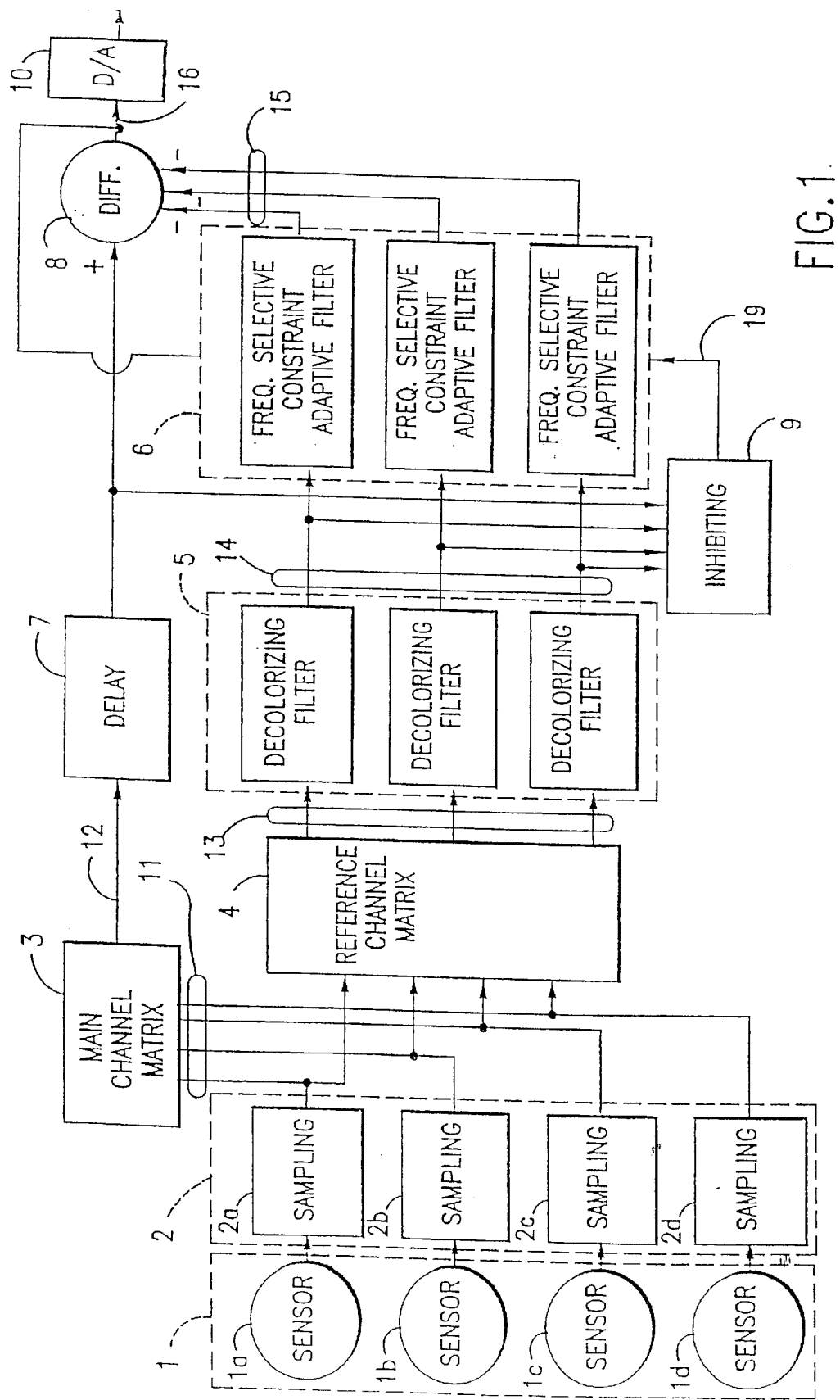
FIG. 1 is a block diagram of an overall system.

FIG. 1 is a block diagram of a system in accordance with a preferred embodiment of the present invention. The system illustrated has a sensor array 1, a sampling unit 2, a main channel matrix unit 3, a reference channel matrix unit 4, a set of decolorizing filters 5, a set of frequency-selective constrained adaptive filters 6, a delay 7, a difference unit 8, an inhibiting unit 9, and an output D/A unit 10.

Sensor array 1, having individual sensors 1a–1d, receives signals from a signal source on-axis from the system and from interference sources located off-axis from the system. The sensor array is connected to sampling unit 2 for sampling the received signals, having individual sampling elements, 2a–2d, where each element is connected to the corresponding individual sensor to produce digital signals 11.

The outputs of sampling unit 2 are connected to main channel matrix unit 3 producing a main channel 12 representing signals received in the direction of a source. The main channel contains both a source signal component and an interference signal component.

The outputs of sampling unit 2 are also connected reference channel matrix unit 4, which generates reference channels 13 representing signals received from directions other that of the signal source. Thus, the reference channels represent interference signals.

The reference channels are filtered through decolorizing filters 5, which generate flat-frequency reference channels 14 having a frequency spectrum whose magnitude is substantially flat over a frequency range of interest. Flat-frequency reference channels 14 are fed into the set of frequency-selective constraint adaptive filters 6, which generate cancelling signals 15.

In the mean time, main channel 12 is delayed through delay 7 so that it is synchronized with cancelling signals 15. Difference unit 8 then subtracts cancelling signals 15 from the delayed main channel to generate an digital output signal 16, which is converted by D/A unit 10 into analog form. Digital output signal 15 is fed back to the adaptive filters to update the filter weights of the adaptive filters.

Flat-frequency reference channels 14 are fed to inhibiting unit 9, which estimates the power of each flat-frequency reference channel as well as the power of the main channel and generates an inhibit signal 19 to prevent signal leakage.

Figure 2:
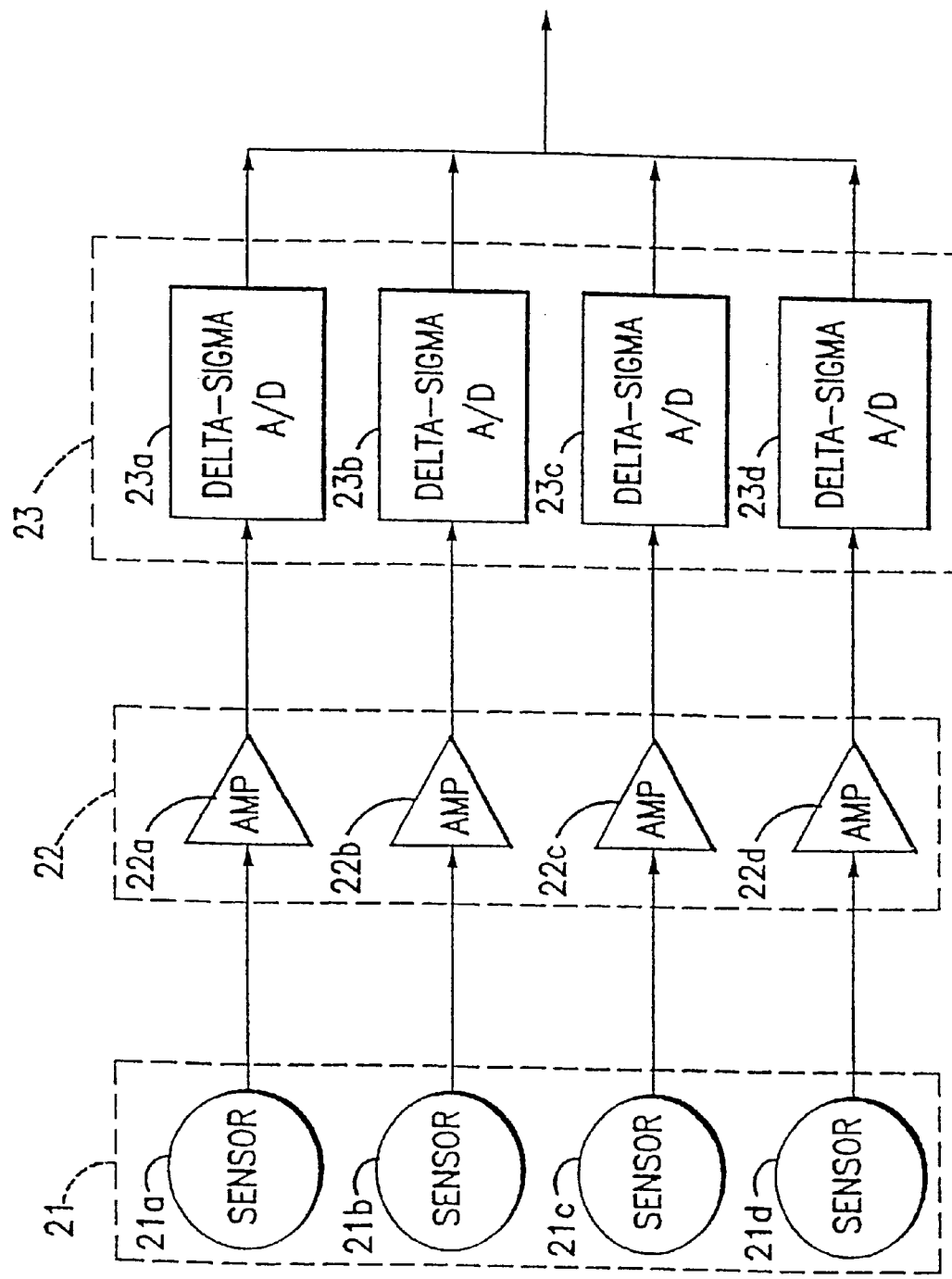
FIG. 2 is a block diagram of a sampling unit.

FIG. 2 depicts a preferred embodiment of the sampling unit. A sensor array 21, having sensor elements 21a–21d, is connected to an analog front end 22, having amplifier elements 22a–22d, where each amplifier element is connected to the output of the corresponding sensor element. In a directional microphone application, each sensor can be either a directional or omnidirectional microphone. The analog front end amplifies the received analog sensor signals to match the input requirement of the sampling elements. The outputs from the analog front ends are connected to a set of delta-sigma A/D converters, 23, where each converter samples and digitizes the amplified analog signals. The delta-sigma sampling is a well-known A/D technique using both oversampling and digital filtering. For details on delta-sigma A/D sampling, see Crystal Semiconductor Corporation, Application Note: Delta-Sigma Techniques, 1989.

Figure 3:
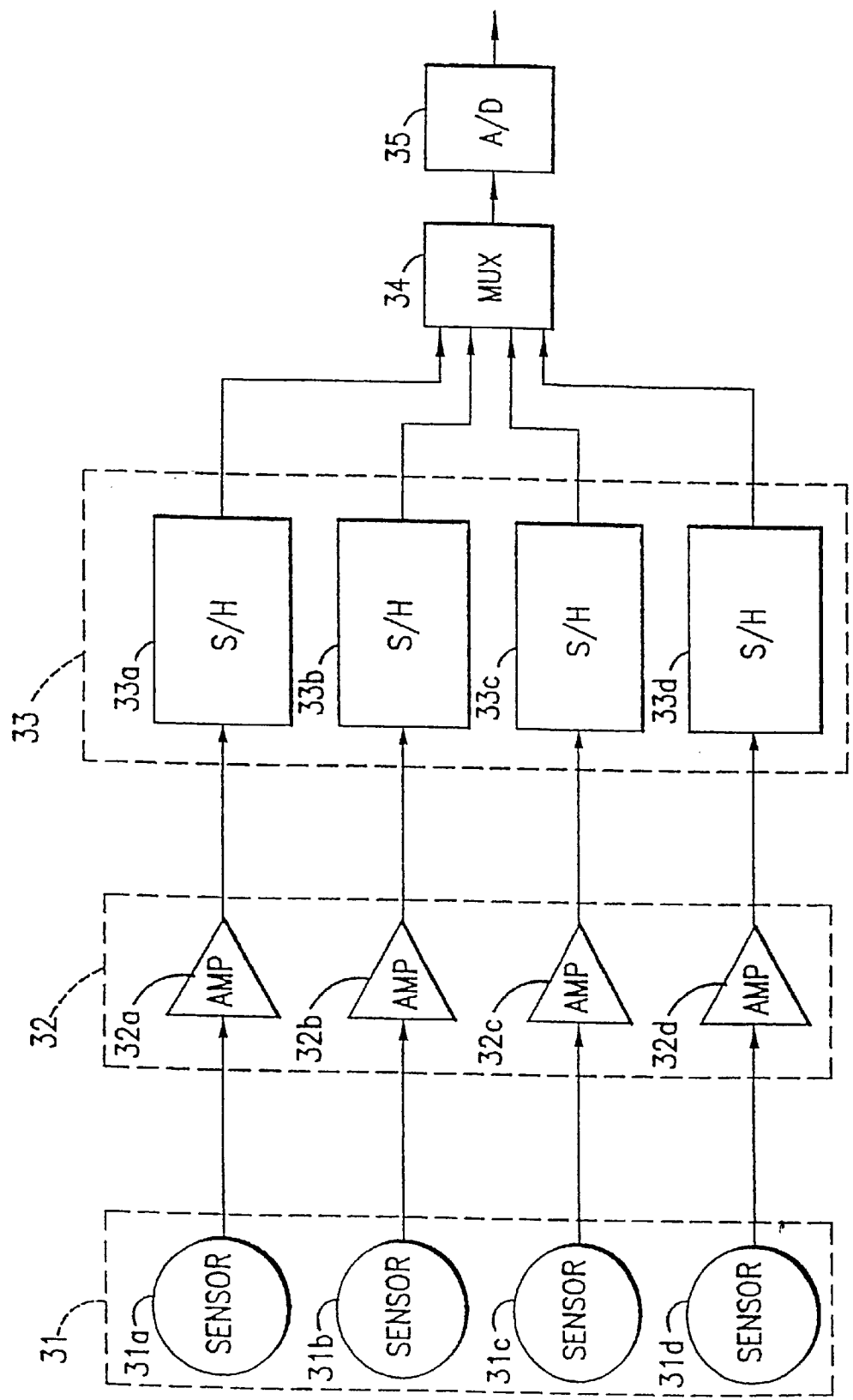
FIG. 3 is a block diagram of an alternative embodiment of a sampling unit.

FIG. 3 shows an alternative embodiment of the sampling unit. A sensor array 31, having sensor elements 31a–32d, is connected to an amplifier 32, having amplifier elements 32a–32d, where each amplifier element amplifies the received signals from the corresponding sensor element. The outputs of the amplifier are connected to a sample & hold (S/H) unit 33 having sample & hold elements 33a–33d, where each S/H element samples the amplified analog signal from the corresponding amplifier element to produce a discrete signal. The outputs from the S/H unit are multiplexed into a single signal through a multiplexor 34. The output of the multiplexor is connected to a conventional A/D converter 35 to produce a digital signal.

Figure 4:
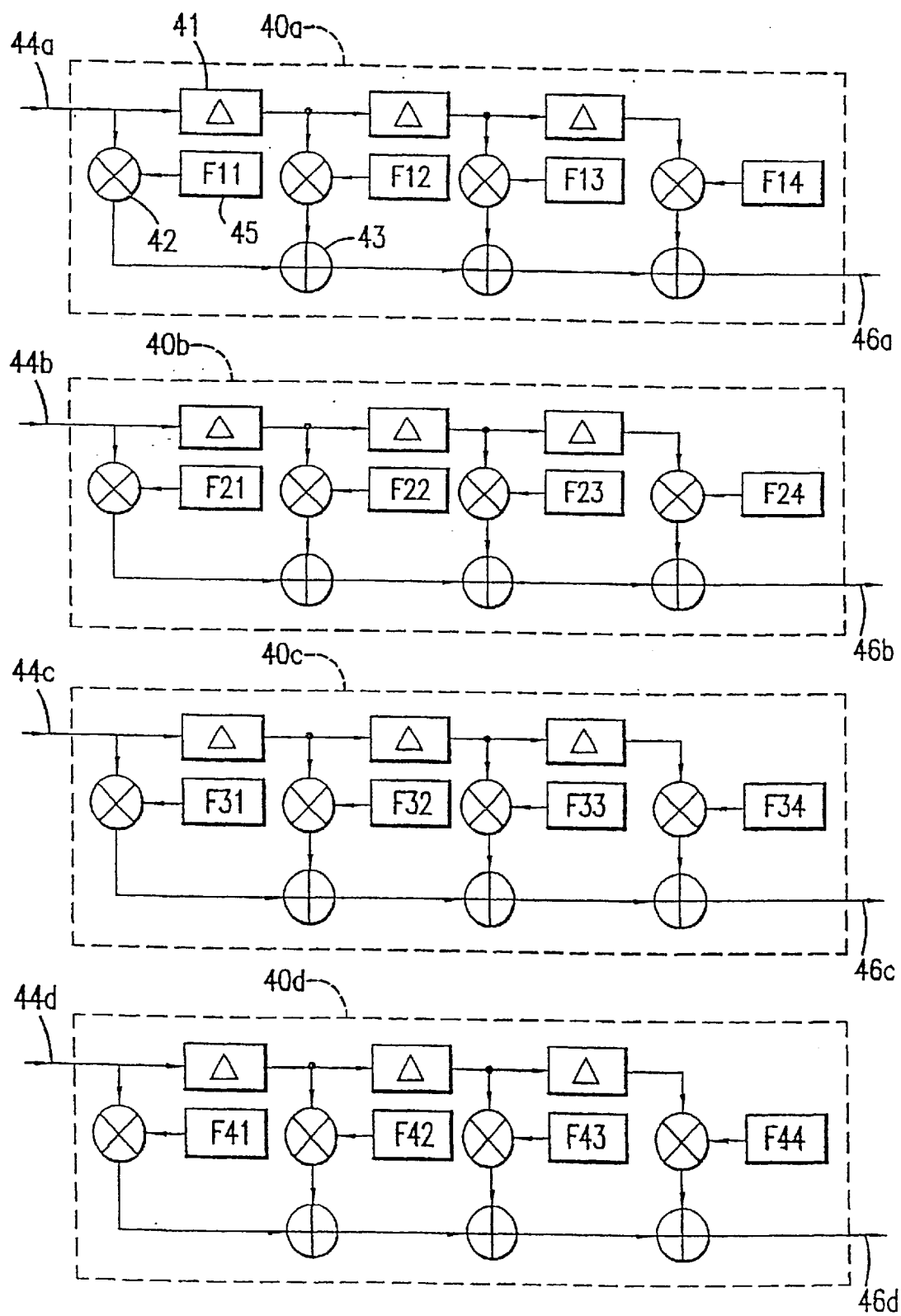
FIG. 4 is a schematic depiction of tapped delay lines used in a main channel matrix and a reference matrix unit.

FIG. 4 is a schematic depiction of tapped delay lines used in the main channel matrix unit and the reference channel matrix in accordance with a preferred embodiment of the present invention. The tapped delay line used here is defined as a nonrecursive digital filter, also known in the art as a transversal filter, a finite impulse response filter or an FIR filter. The illustrated embodiment has 4 tapped delay lines, 40a–40d. Each tapped delay line includes delay elements 41, multipliers 42 and adders 43. Digital signals, 44a–44d, are fed into the set of tapped delay lines 40a–40d. Delayed signals through delay elements 41 are multiplied by filter coefficients, $F_{ij}$, 45 and added to produce outputs, 46a–46d.

The n-th sample of an output from the i-th tapped delay line, $Y_i(n)$, can then be expressed as:

$$Y_i(n) = \Sigma^k_{j=0} F_{i,j} X_i(n-j),$$

where k is the length of the filter, and $X_i(n)$ is the n-th sample of an input to the i-th tapped delay line.

Figure 5:
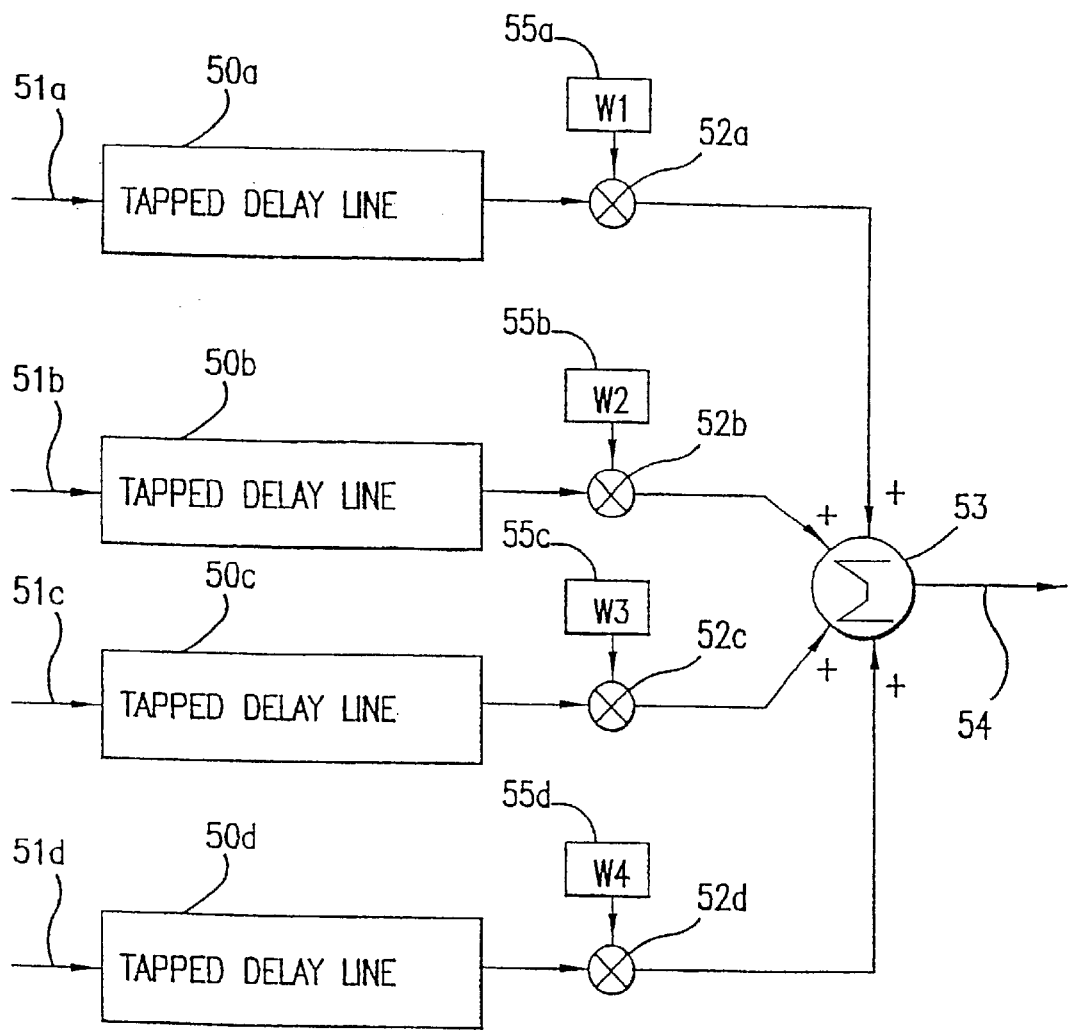
FIG. 5 is a schematic depiction of a main channel matrix unit.

FIG. 5 depicts the main channel matrix unit for generating a main channel in accordance with a preferred embodiment of the present invention. The unit has tapped delay lines, 50a–50d, as an input section taking inputs 51a–51d from the sampling unit. Its output section includes multipliers, 52a–52d, where each multiplier is connected to the corresponding tapped delay line and an adder 53, which sums all output signals from the multipliers. The unit generates a main channel 54, as a weighted sum of outputs from all multipliers. The filter weights 55a–55d can be any combination of fractions as long as their sum is 1. For example, if 4 microphones are used, the embodiment may use the filter weights of ¼ in order to take into account of the contribution of each microphone.

The unit acts as a beamformer, a spatial filter which filters a signal coming in all directions to produce a signal coming in a specific direction without physically moving the sensor array. The coefficients of the tapped delay lines and the filter weights are set in such a way that the received signals are spatially filtered to maximize the sensitivity toward the signal source.

Since some interference signals find their way to reach the signal source due to many factors such as the reverberation of a room, main channel 54 representing the received signal in the direction of the signal source contains not only a source signal component, but also an interference signal component.

Figure 6:
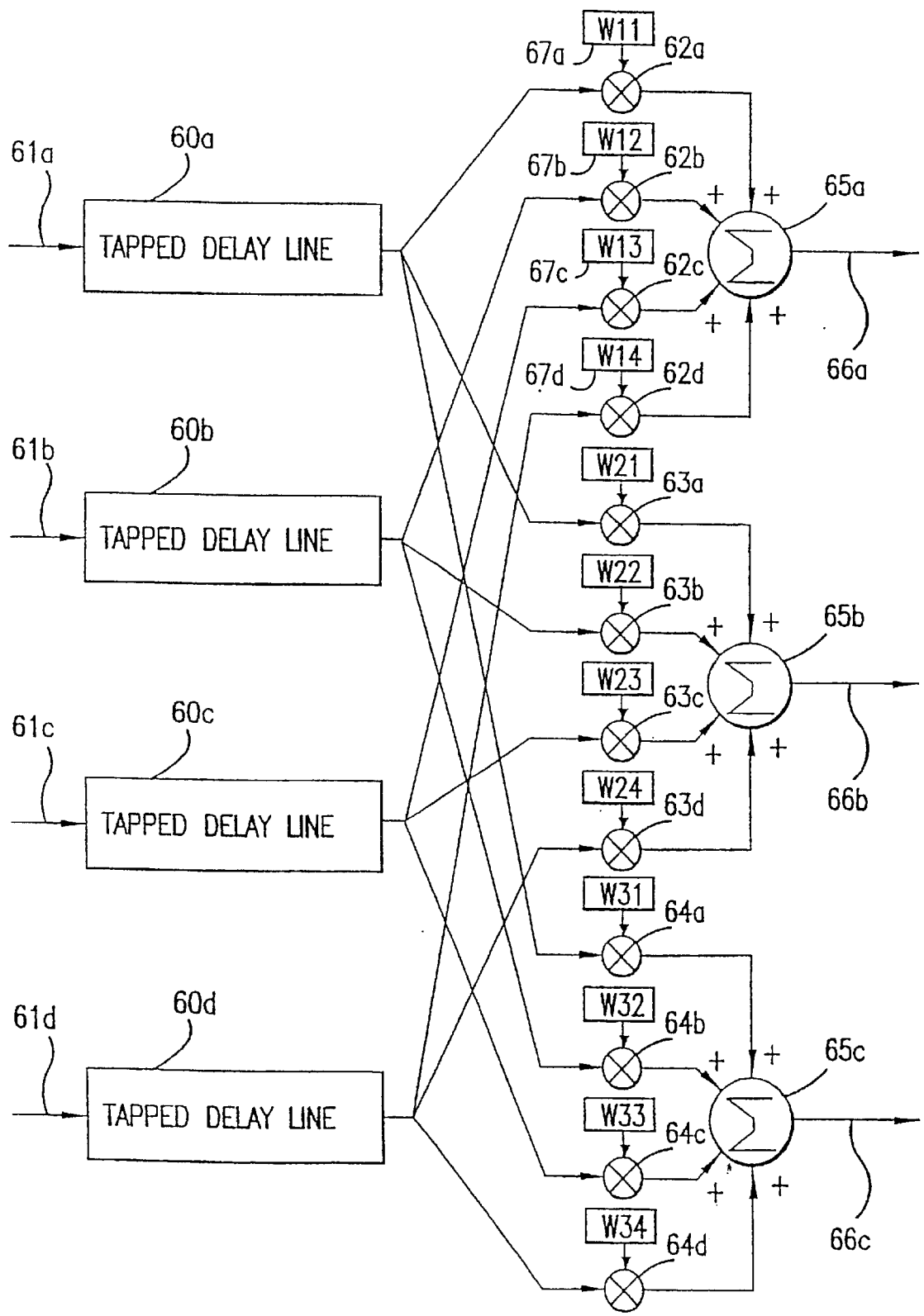
FIG. 6 is a schematic depiction of a reference channel matrix unit.

FIG. 6 depicts the reference channel matrix unit for generating reference matrix channels in accordance with a preferred embodiment of the present invention. It has tapped delay lines, 60a–60d, as an input section taking inputs 61a–61d from the sampling unit. The same tapped delay lines as that of FIG. 4 may be used, in which case the tapped delay lines may be shared by the main and reference channel matrix units.

Its output section includes multipliers, 62a–62d, 63a–63d, 64a–64d and adders 65a–65c, where each multiplier is connected to the corresponding tapped delay line and adder. The unit acts as a beamformer which generates the reference channels 66a–66c representing signals arriving off-axis from the signal source by obtaining the weighted differences of certain combinations of outputs from the tapped delay lines. The filter weight combinations can be any numbers as long as their sum of filter weights for combining a given reference channel is 0. For example, the illustrated embodiment may use a filter weight combination, (W11, W12, W13, W14)=(0.25, 0.25, 0.25, −0.75), in order to combine signals 61a–61d to produce reference channel 66a.

The net effect is placing a null (low sensitivity) in the receiving gain of the beamformer toward the signal source. As a result, the reference channels represent interference signals in directions other than that of the signal source. In other words, the unit "steers" the input digital data to obtain interference signals without physically moving the sensor array.

Figure 7:
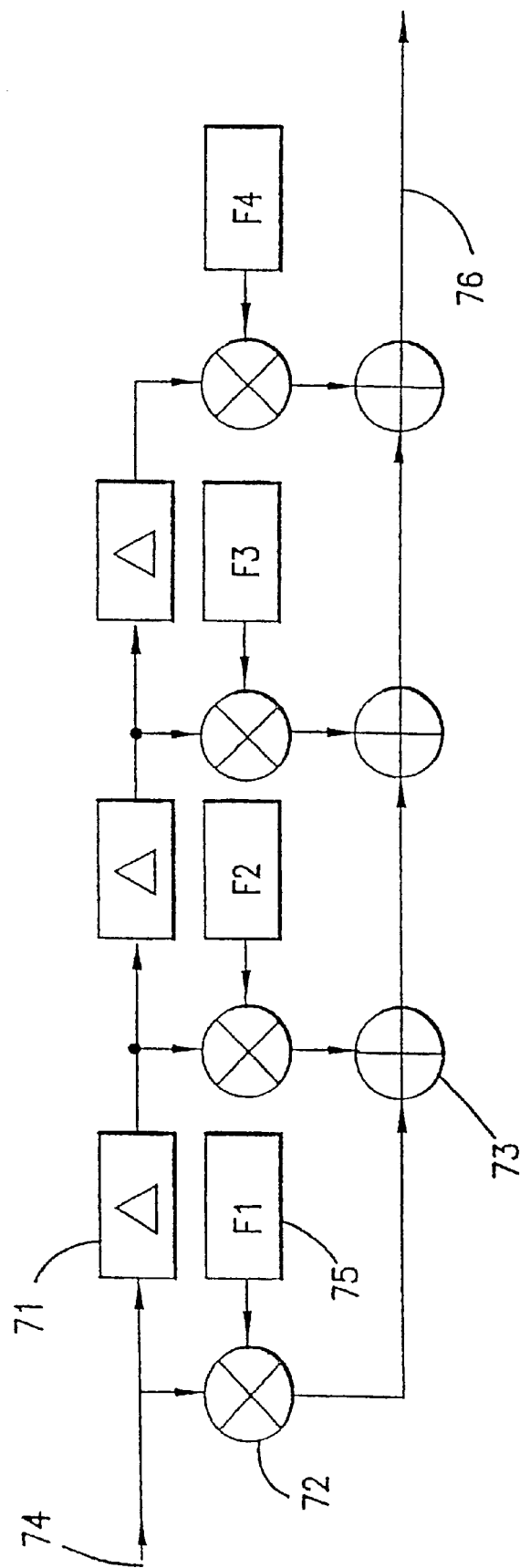
FIG. 7 is a schematic depiction of a decolorizing

FIG. 7 is a schematic depiction of the decolorizing filter in accordance with a preferred embodiment of the present invention. It is a tapped delay line including delay elements 71, multipliers 72 and adders 73. A reference channel 74 is fed into the tapped delay line. Delayed signals are multiplied by filter coefficients, $F_i$, 75 and added to produce an output 76. The filter coefficients are set in such a way that the filter amplifies the low-magnitude frequency components of an input signal to obtain an output signal having a substantially flat frequency spectrum.

As mentioned before in the background section, the output of a conventional adaptive beamformer suffers a non-uniform frequency behavior. This is because the reference channels do not have a flat frequency spectrum. The receiving sensitivity of a beamformer toward a particular angular direction is often described in terms of a gain curve. As mentioned before, the reference channel is obtained by placing a null in the gain curve (making the sensor array insensitive) in the direction of the signal source. The resulting gain curve has a lower gain for lower frequency signals than higher frequency signals. Since the reference channel is modified to generate a cancelling signal, a non-flat frequency spectrum of the reference channel is translated to a non-uniform frequency behavior in the system output.

The decolorizing filter is a fixed-coefficient filter which flattens the frequency spectrum of the reference channel (thus "decolorizing" the reference channel) by boosting the low frequency portion of the reference channel. By adding the decolorizing filters to all outputs of the reference channel matrix unit, a substantially flat frequency response in all directions is obtained.

The decolorizing filter in the illustrated embodiment uses a tapped delay line filter which is the same as a finite impulse response (FIR) filter, but other kinds of filters such as an infinite impulse response (IIR) filter can also be used for the decolorizing filter in an alternative embodiment.

Figure 8:
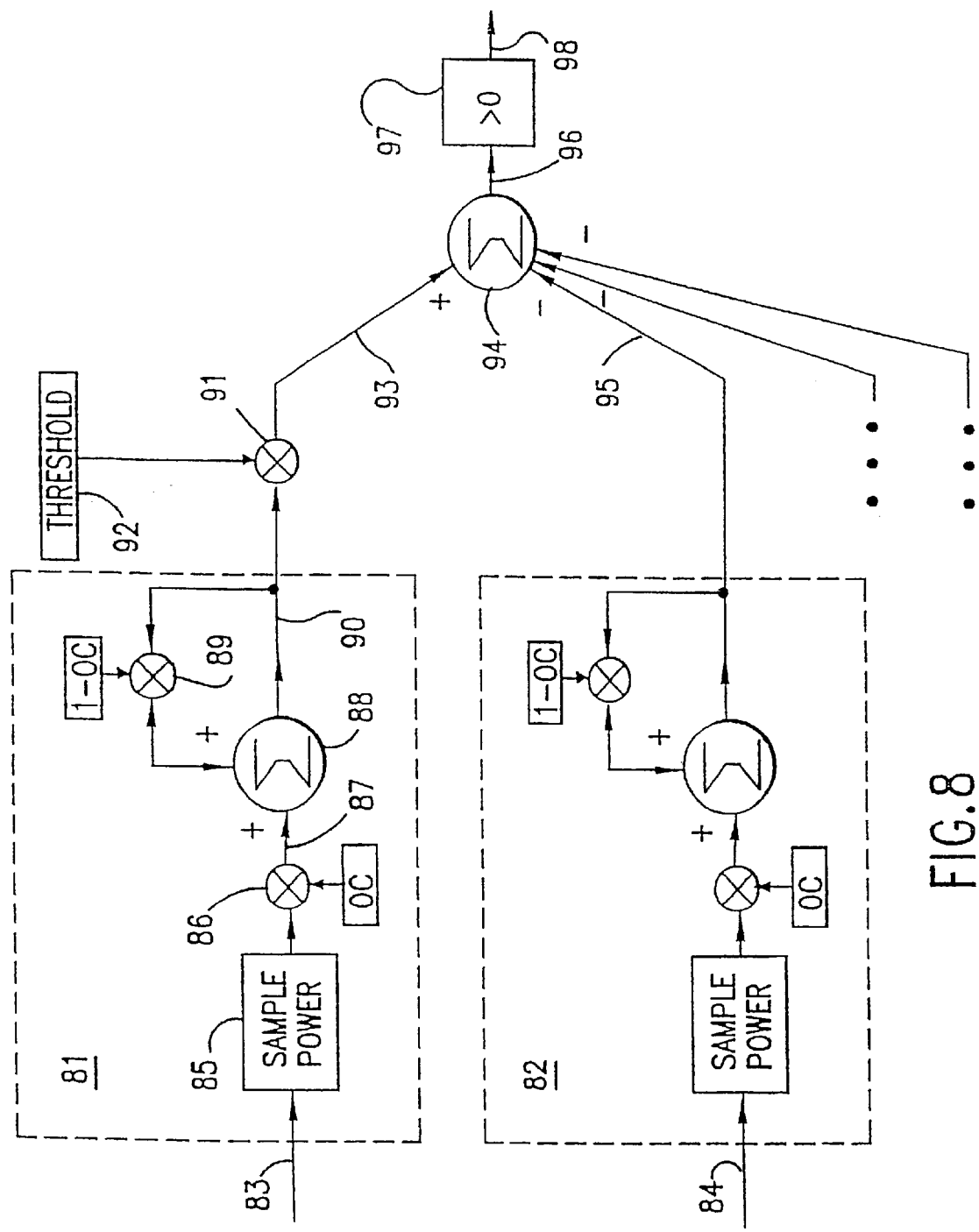
FIG. 8 is a schematic depiction of an inhibiting unit based on directional interference.

FIG. 8 depicts schematically the inhibiting unit in accordance with a preferred embodiment of the present invention. It includes power estimation units 81, 82 which estimate the power of a main channel 83 and each reference channel 84, respectively. A sample power estimation unit 85 calculates the power of each sample. A multiplier 86 multiplies the power of each sample by a fraction, $\alpha$, which is the reciprocal of the number of samples for a given averaging period to obtain an average sample power 87. An adder 88 adds the average sample power to the output of another multiplier 89 which multiplies a previously calculated main channel power average 90 by $(1-\alpha)$. A new main channel power average is obtained by (new sample power)$\times\alpha$+(old power average)$\times(1-\alpha)$. For example, if a 100– sample average is used, $\alpha=0.01$. The updated power average will be (new sample power)$\times 0.01$+(old power average)$\times 0.99$. In this way, the updated power average will be available at each sampling instant rather than after an averaging period. Although the illustrated embodiment shows an on-the-fly estimation method of the power average, other kinds of power estimation methods can also be used in an alternative embodiment.

A multiplier 91 multiplies the main channel power 89 with a threshold 92 to obtain a normalized main channel power average 93. An adder 94 subtracts reference channel power averages 95 from the normalized main channel power average 93 to produce a difference 96. If the difference is positive, a comparator 97 generates an inhibit signal 98. The inhibit signal is provided to the adaptive filters to stop the adaptation process to prevent signal leakage.

Although the illustrated embodiment normalizes the main channel power average, an alternative embodiment may normalize the reference channel power average instead of the main channel power average. For example, if the threshold 92 in the illustrated embodiment is 0.25, the same effect can be obtained in the alternative embodiment by normalizing each reference channel power average by multiplying it by 4.

This inhibition approach is different from the prior art SNR-based inhibition approach mentioned in the background section in that it detects the presence of significant directional interference which the prior art approach does not consider. As a result, the directional-interference-based inhibition approach stops the adaptation process when there is no significant directional interference to be eliminated, whereas the prior art approach does not.

For example, where there is a weak source signal (e.g. during speech intermission) and there is almost no directional interference except some uncorrelated noise (such as noise due to wind or mechanical vibrations on the sensor structure), the SNR-based approach would allow the adaptive filter to continue adapting due to the small SNR. The continued adaptation process is not. desirable because there is very little directional interference to be eliminated in the first place, and the adaptation process searches in vain for new filter weights to eliminate the uncorrelated noise, which often results in cancelling the source signal component of the received signal.

By contrast, the directional-interference-based inhibition mechanism will inhibit the adaptation process in such a case because the strength of directional interference as reflected in the reference channel power average will be smaller than the normalized main channel power average, producing a positive normalized power difference. The adaptive process is inhibited as a result until there is some directional interference to be eliminated.

Figure 9:
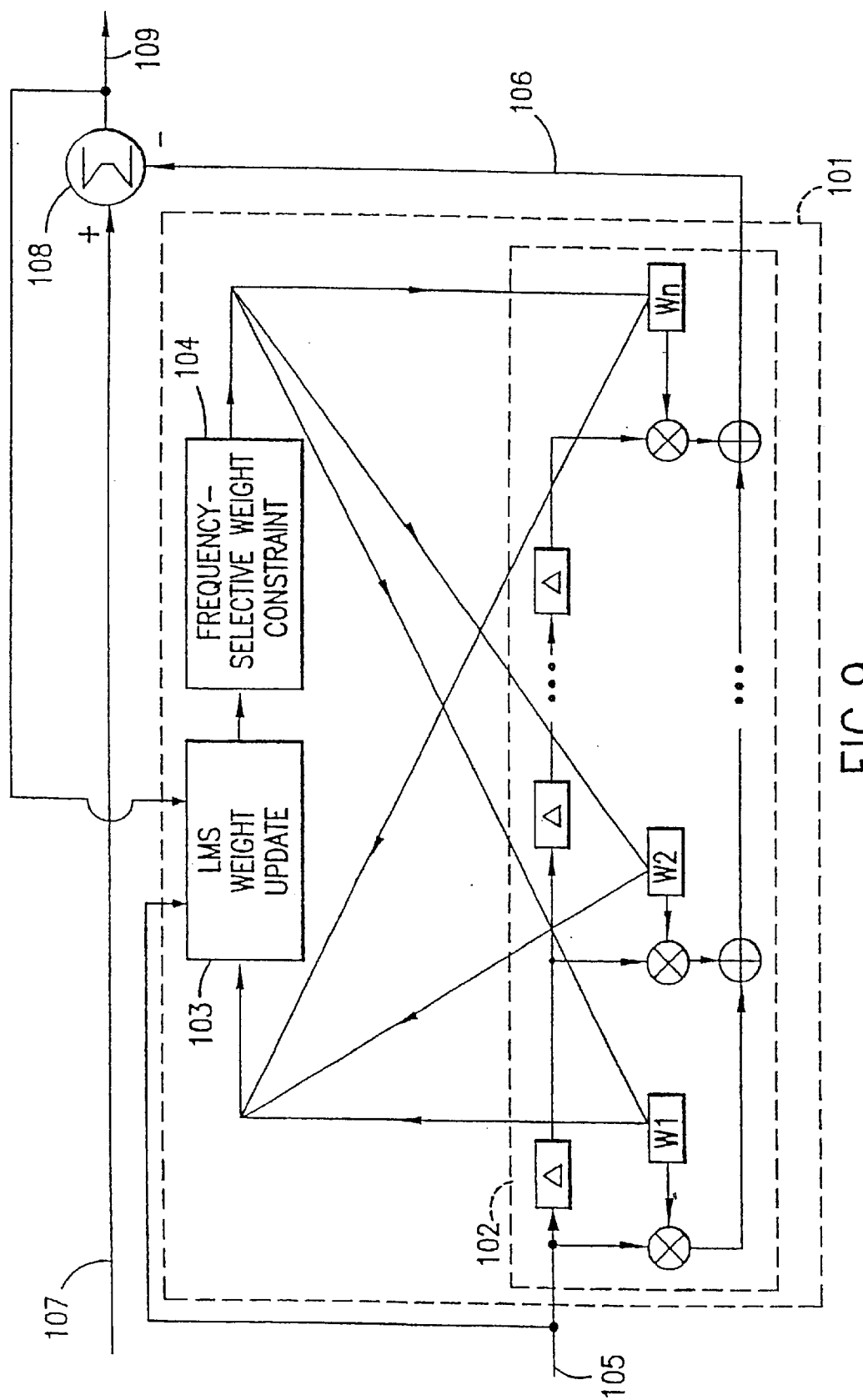
FIG. 9 is a schematic depiction of a frequency-selective constraint adaptive filter.

FIG. 9 shows the frequency-selective constraint adaptive filter together with the difference unit in accordance with a preferred embodiment of the present invention. The frequency-selective constraint adaptive filter 101 includes a finite impulse response (FIR) filter 102, an LMS weight updating unit 103 and a frequency-selective weight-constraint unit 104. In an alternative embodiment, an infinite impulse response (IIR) filter can be used instead of the FIR filter.

A flat-frequency reference channel 105 passes through FIR filter 102 whose filter weights are adjusted to produce a cancelling signal 106 which closely approximates the actual interference signal component present in a main channel 107. In a preferred embodiment, the main channel is obtained from the main channel matrix unit after a delay in order to synchronize the main channel with the cancelling signal. In general, there is a delay between the main channel and the cancelling signal because the cancelling signal is obtained by processing reference channels through extra stages of delay, i.e., the decolorization filters and adaptive filters. In an alternative embodiment, the main channel directly from the main channel matrix unit may be used if the delay is not significant.

A difference unit 108 subtracts cancelling signal 106 from main channel 107 to generates an output signal 109. Adaptive filter 101 adjusts filter weights, $W_1$–$W_n$, to minimize the power of the output signal. When the filter weights settle, output signal 109 generates the source signal substantially free of the actual interference signal component because cancelling signal 106 closely tracks the interference signal component. Output signal 109 is sent to the output D/A unit to produce an analog output signal. Output signal 109 is also used to adjust the adaptive filter weights to further reduce the interference signal component.

There are many techniques to continuously update the values of the filter weights. The preferred embodiment uses the Least Mean-Square (LMS) algorithm which minimize the mean-square value of the difference between the main channel and the cancelling signal, but in an alternative embodiment, other algorithms such as Recursive Least Square (RLS) can also be used.

Under the LMS algorithm, the adaptive filter weights are updated according to the following:

$$W_p(n+1)=W_p(n)+2\mu r(n-p)e(n)$$

where n is a discrete time index; $W_p$ is a p-th filter weight of the adaptive filter; e(n) is a difference signal between the main channel signal and the cancelling signal; r(n) is a reference channel; and $\mu$ is an adaptation constant that controls the speed of adaptation.

Figure 10:
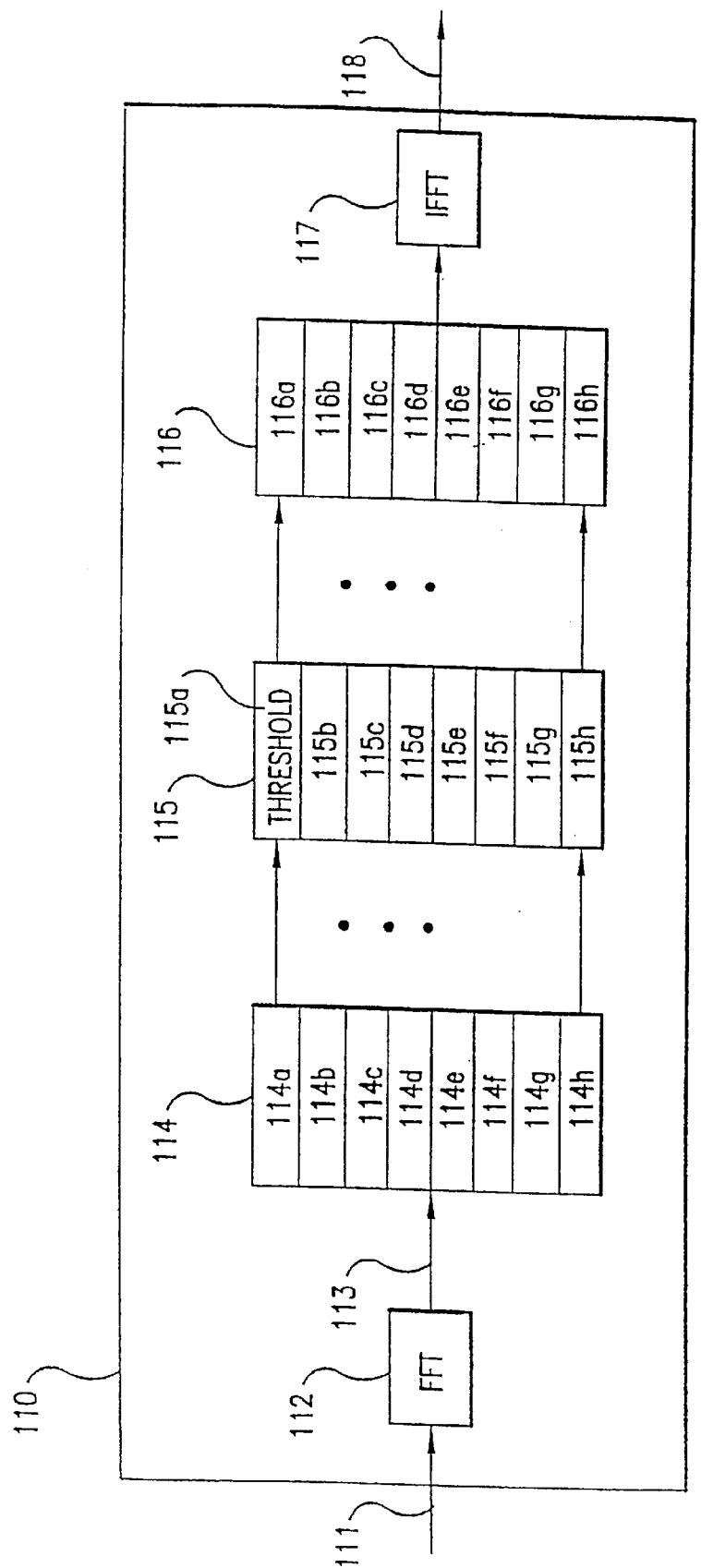
FIG. 10 is a block diagram of a frequency-selective weight-constraint unit.
Figure 11A:
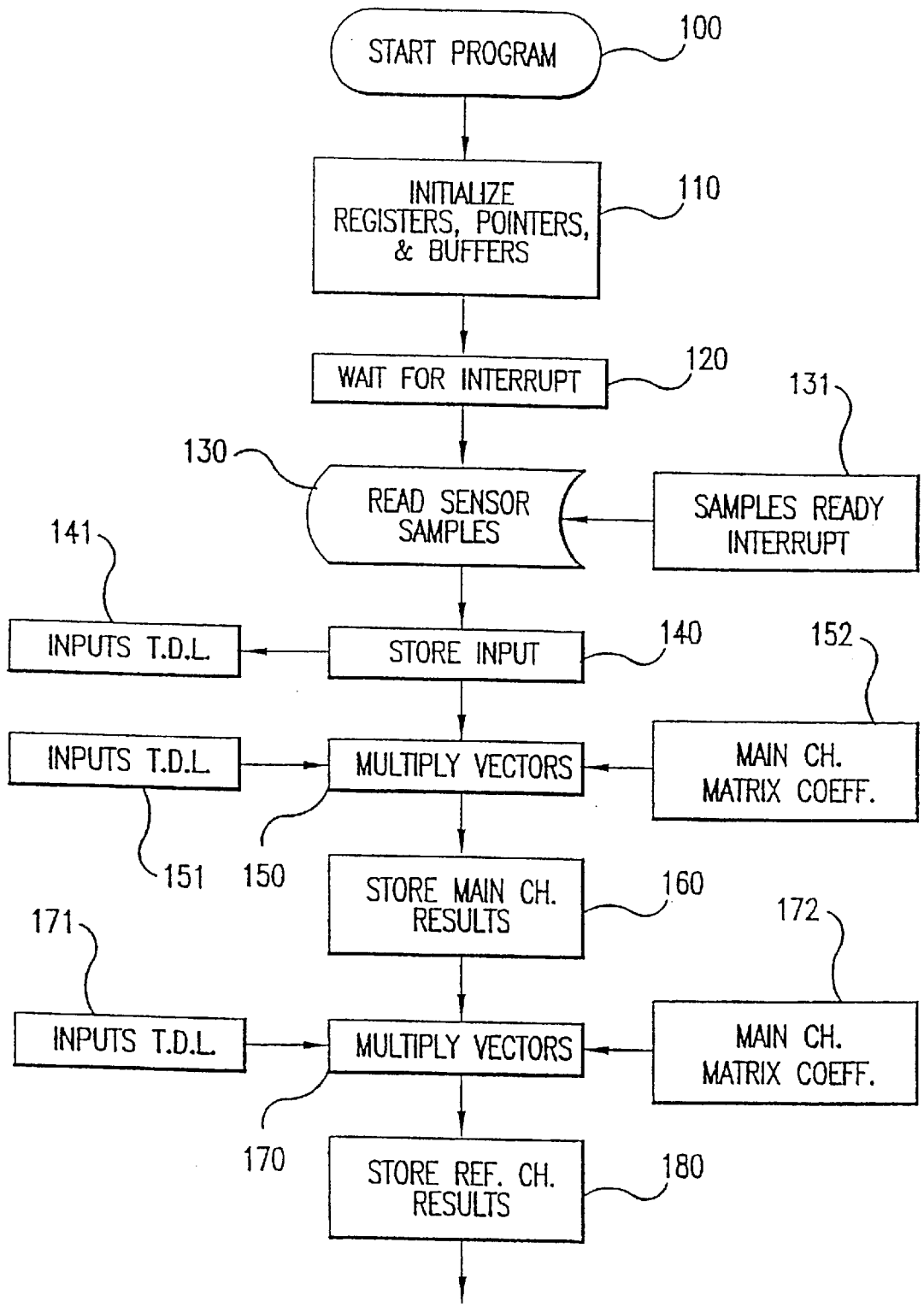
FIG. 11 is a flow chart depicting the operation of a program that can be us ed to implement the invention.
Figure 11B:
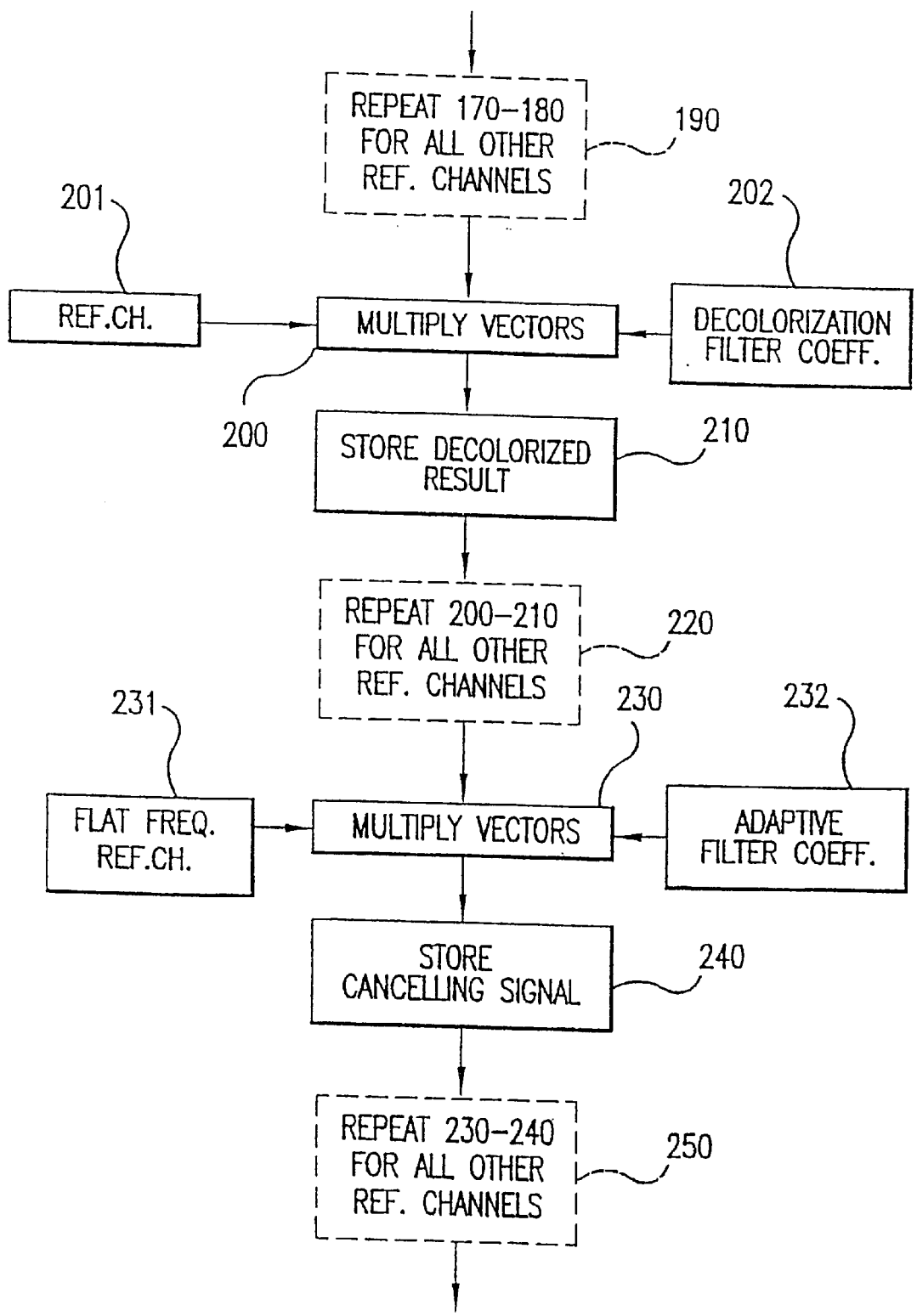
Figure 11C:
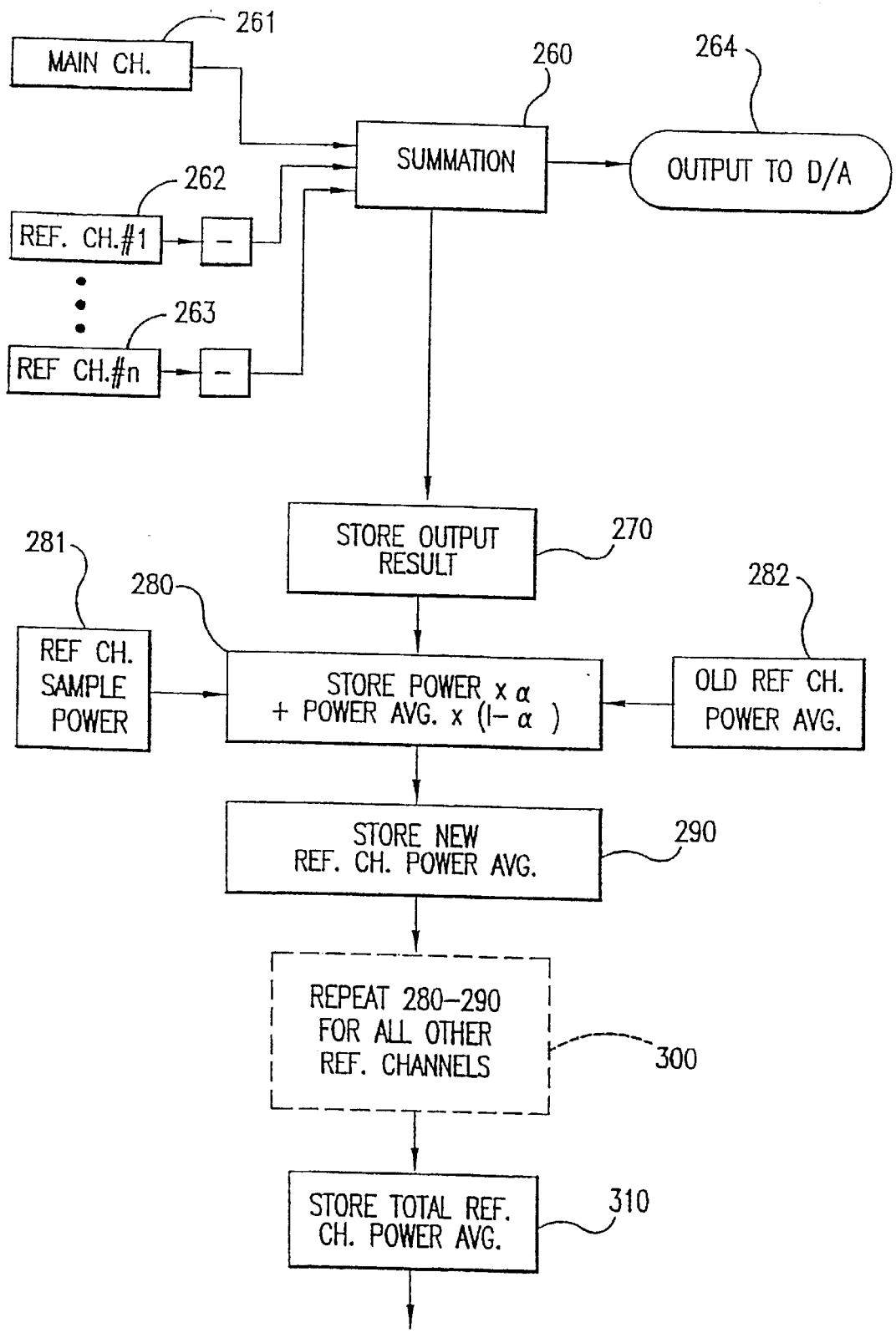
Figure 11D:
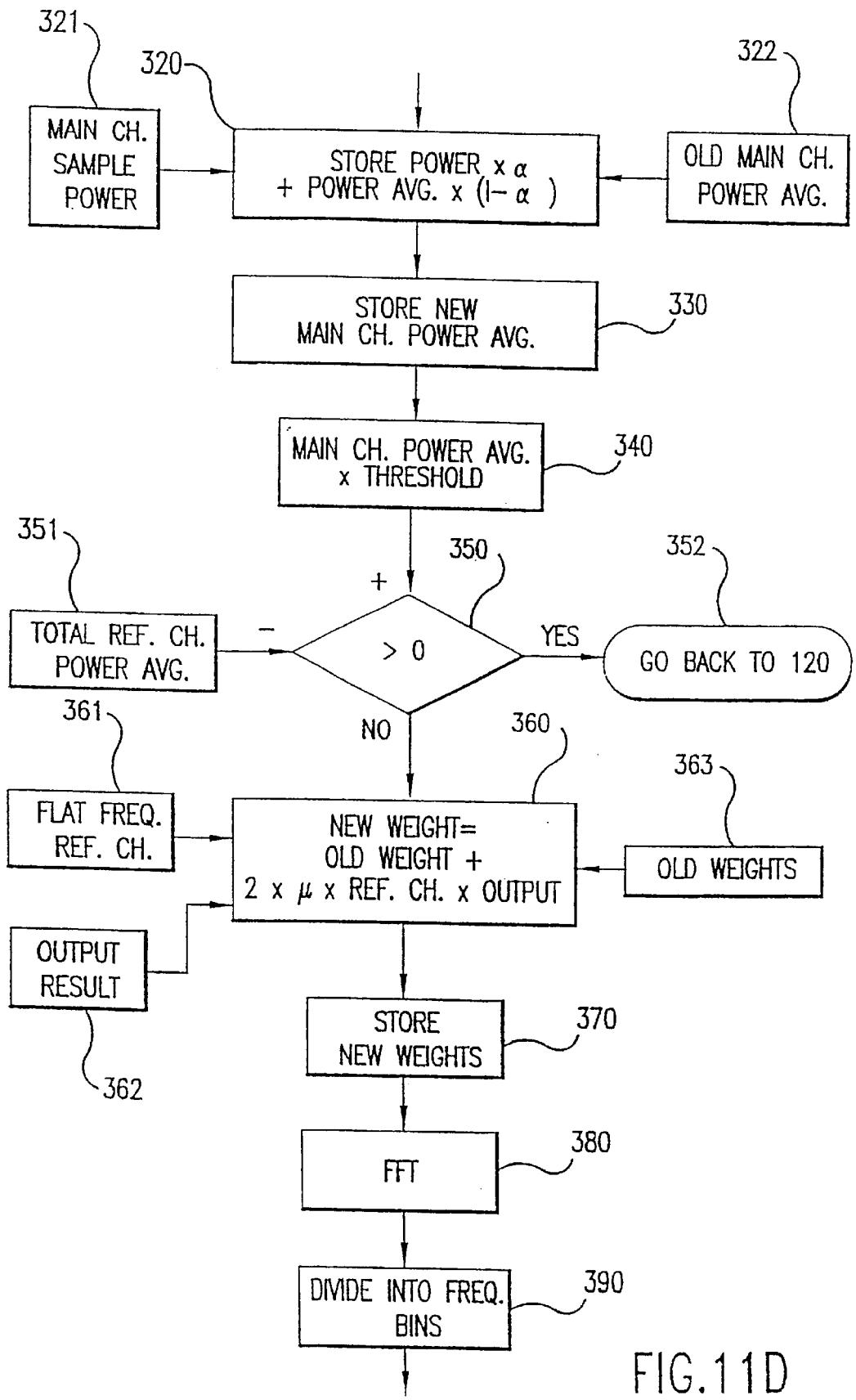
Figure 11E:
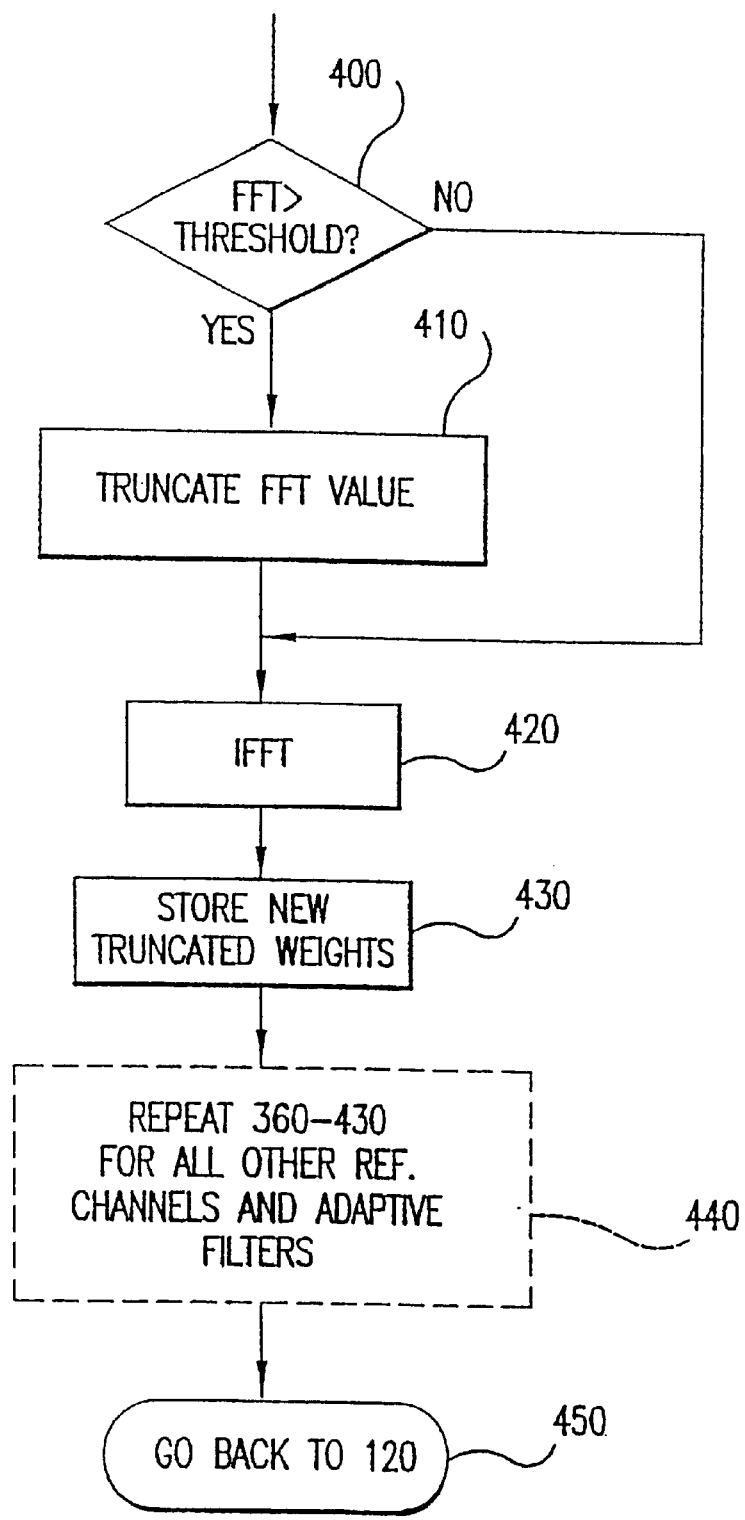

FIG. 10 depicts a preferred embodiment of the frequency-selective weight-constraint unit. The frequency-selective weight-control unit 110 includes a Fast Fourier Transform (FFT) unit 112, a set of frequency bins 114, a set of truncating units 115, a set of storage cells 116, and an Inverse Fast Fourier Transform (IFFT) unit 117, connected in series.

The FFT unit 112 receives adaptive filter weights 111 and performs the FFT of the filter weights 111 to obtain frequency representation values 113. The frequency representation values are then divided into a set of frequency bands and stored into the frequency bins 114a–114h. Each frequency bin stores the frequency representation values within a specific bandwidth assigned to each bin. The values represent the operation of the adaptive filter with respect to a specific frequency component of the source signal. Each of the truncating units 115a–115h compares the frequency representation values with a threshold assigned to each bin, and truncates the values if they exceeds the threshold. The truncated frequency representation values are temporarily stored in 116a–116h before the IFFT unit 117 converts them back to new filter weight values 118.

In addition to the inhibiting mechanism based on directional interference, the frequency-selective weight-constraint unit further controls the adaptation process based on the frequency spectrum of the received source signal. Once the adaptive filter starts working, the performance change in the output of the filter, better or worse, becomes drastic. Uncontrolled adaptation can quickly lead to a drastic performance degradation.

The weight-constraint mechanism is based on the observation that a large increase in the adaptive filter weight values hints signal leakage. If the adaptive filter works properly, there is no need for the filter to increase the filter weights to large values. But, if the filter is not working properly, the filter weights tend to grow to large values.

One way to curve the growth is to use a simple truncating mechanism to truncate the values of filter weights to pre-determined threshold values. In this way, even if the overall signal power may be high enough to trigger the inhibition mechanism, the weight-constraint mechanism can still prevent the signal leakage.

For narrow band signals, such as a speech signal or a tonal signal, having their power spectral density concentrated in a narrow frequency range, signal leakage may not be manifested in a large growth of the filter weight values in the time domain. However, the filter weight values in the frequency domain will indicate some increase because they represent the operation of the adaptive filter in response to a specific frequency component of the source signal. The frequency-selective weight-constraint unit detects that condition by sensing a large increase in the frequency representation values of the filter weights. By truncating the frequency representation values in the narrow frequency band of interest and inverse-transforming them back to the time domain, the unit acts to prevent the signal leakage involving narrow band signals.

The system described herein may be implemented using commercially available digital signal processing (DSP) systems such as Analog Device 2100 series.

FIG. 11 shows a flow chart depicting the operation of a program for a DSP processor in accordance with a preferred embodiment of the present invention.

After the program starts at step 100, the program initializes registers and pointers as well as buffers (step 110). The program then waits for an interrupt from a sampling unit requesting for processing of samples received from the array of sensors (step 120). When the sampling unit sends an interrupt (step 131) that the samples are ready, the program reads the sample values (step 130) and stores the values (step 140). The program filters the stored values using a routine implementing a tapped delay line and stores the filtered input values (step 141).

The program then retrieves the filtered input values (step 151) and main channel matrix coefficients (step 152) to generate a main channel (step 150) by multiplying the two and to store the result (step 160).

The program retrieves the filtered input values (step 171) and reference channel matrix coefficients (step 152) to generate a reference channel (reference channel #1) by multiplying the two (step 170) and to store the result (step 180). Steps 170 and 180 are repeated to generate all other reference channels (step 190).

The program retrieves one of the reference channels (step 201) and decolorization filter coefficients for the corresponding reference channel (step 202) to generate a flat-frequency reference channel by multiplying the two (step 200) and stores the result (step 210). Steps 200 and 210 are repeated for all other reference channels (step 220).

The program retrieves one of the flat-frequency reference channels (step 231) and adaptive filter coefficients (step 232) to generate cancelling signal (step 230) by multiplying the two and to store the result (step 240). Steps 230 and 240 are repeated for all other reference channels to generate more cancelling signals (step 250).

The program retrieves cancelling signals (steps 262–263) to subtract them from the main channel (retrieved at step 261) to cancel the interference signal component in the main channel (step 260). The output is send to a D/A unit to reproduce the signal without interference in analog form (step 264). The output is also stored (step 270).

The program calculates the power of a reference channel sample (step 281) and retrieves an old reference channel power average (step 282). The program multiplies the sample power by $\alpha$ and the old power average by $(1-\alpha)$, and sums them (step 280), and stores the result as a new power average (step 290). This process is repeated for all other reference channels (step 300) and the total sum of power averages of all reference channels is stored (step 310).

The program multiplies the power of a main channel sample (retrieved at step 321) by a and an old main channel power average (retrieved at step 322) by $(1-\alpha)$, sums them (step 320) and stores them as a new main channel power average (step 330).

The program then multiplies the main channel power with a threshold to obtain a normalized main channel power average (step 340). The program subtracts the total reference channel power average (retrieved at step 341) from the normalized main channel power average to produce a difference (step 350). If the difference is positive, the program goes back to step 120 where it simply waits for another samples.

If the difference is negative, the program enters a weight-updating routine. The program calculates a new filter eight by adding [2×adaptation constant×reference channel sample (retrieved at step 361)×output (retrieved at step 362)] to an old filter weight (retrieved at step 363) to update the weight (step 360) and stores the result (step 370).

The program performs the FFT of the new filter weights to obtain their frequency representation (step 380). The frequency representation values are divided into several frequency bands and stored into a set of frequency bins (step 390). The frequency representation values in each bin are compared with a threshold associated with each frequency bin (step 400). If the values exceed the threshold, the values are truncated to the threshold (step 410). The program performs the IFFT to convert the truncated frequency representation values back to filter weight values (step 420) and stores them (step 430). The program repeats the weight-updating routine, steps 360–430, for all other reference channels and associated adaptive filters (step 440). The program then goes back to step 120 to wait for an interrupt for a new round of processing samples (step 450).

While the invention has been described with reference to preferred embodiments, it is not limited to those embodiments. It will be appreciated by those of ordinary skill in the art that modifications can be made to the structure and form of the invention without departing from its spirit and scope which is defined in the following claims.

What is claimed is:

1. A method for processing digital input data representing signals containing a source signal from a signal source on-axis from an array of sensors as well as interference signals from interference sources located off-axis from the signal source and for producing digital output data representing the source signal with reduced interference signals relative to the source signal, comprising the steps of:

generating a main channel from the digital input data, the main channel representing signals received in the direction of the signal source and having a source signal component and an interference signal component;

generating at least one reference channel from the digital input data, each reference channel representing signals received in directions other than that of the signal source;

adaptively filtering said at least one reference channel using filter weight values to generate a cancelling signal approximating the interference signal component in the main channel;

generating the digital output data by subtracting the cancelling signal from the main channel;

deriving new filter weight values so that the difference between the main channel and the cancelling signal is minimized; and truncating the new filter weight values to predetermined threshold values when each of the new filter weight values exceeds the corresponding threshold value.

2. The method of claim 1, further comprising the step of filtering said at least one reference channel so that it has a substantially flat frequency spectrum.

3. The method of claim 1, further comprising the step of inhibiting the generation of the cancelling signal when a normalized power difference between the main channel and said at least one reference channel is positive.

4. A method for processing digital input data representing signals containing a source signal from a signal source on-axis from an array of sensors as well as interference signals from interference sources located off-axis from the signal source and for producing digital output data representing the source signal with reduced interference signals relative to the source signal, comprising the steps of:

generating a main channel from the digital input data, the main channel representing signals received in the direction of the signal source and having a source signal component and an interference signal component;

generating at least one reference channel from the digital input data, each reference channel representing signals received in directions other than that of the signal source;

filtering said at least one reference channel using filter weight values to generate a cancelling signal approximating the interference signal component in the main channel;

generating the digital output data by subtracting the cancelling signal from the main channel;

deriving new filter weight values so that the difference between the main channel and the cancelling signal is minimized; and constraining the new filter weight values by converting the new filter weight values to frequency representation values, truncating the frequency representation values to predetermined threshold values, and converting them back to filter weight values.

5. The method of claim 4 wherein constraining the new filter weight values comprises:

generating frequency representation values of the new filter weight values;

divide the frequency representation values into a plurality of frequency bins;

truncating the frequency representation values in each frequency bin if they exceed a predetermined threshold value associated with each frequency bin; and converting the frequency representation values back to filter weight values.

6. The method of claim 5 wherein generating the frequency representation is done by using the Fast Fourier Transform, and converting back is done by using the Inverse Fast Fourier Transform.

7. The method of claim 4, further comprising the step of filtering said at least one reference channel so that it has a substantially flat frequency spectrum.

8. The method of claim 4, further comprising the step of inhibiting the generation of the cancelling signal when a normalized power difference between the main channel and said at least one reference channel is positive.

9. A method for receiving a source signal from a signal source as well as interference signals from interference sources and for producing an output signal with reduced interference signals relative to the source signal, comprising the steps of:

receiving analog signals from a sensor array of spatially distributed sensors;

sampling the analog signals to convert them to digital form;

generating a main channel representing signals received in the direction of the signal source, the main channel having a source signal component and an interference signal component;

generating at least one reference channel, each reference channel representing signals received in directions other than that of the signal source;, filtering said at least one reference channel using filter weight values to generate a cancelling signal approximating the interference signal component in the main channel;

generating a digital output signal by subtracting the cancelling signal from the main channel;

converting the digital output signal to analog form;

deriving new filter weight values so that the difference between the main channel and the cancelling signal is minimized; and truncating the new filter weight values to predetermined threshold values when each of the new filter weight values exceeds the corresponding threshold value.

10. The method of claim 9, further comprising the step of filtering said at least one reference channel so that it has a substantially flat frequency spectrum.

11. The method of claim 9, further comprising the step of inhibiting the generation of the cancelling signal when a normalized power difference between the main channel and said at least one reference channel is positive.

12. A method for receiving a source signal from a signal source as well as interference signals from interference sources and for producing an output signal with reduced interference signals relative to the source signal, comprising the steps of:

receiving analog signals from a sensor array of spatially distributed sensors;

sampling the analog signals to convert them to digital form;

generating a main channel representing signals received in the direction of the signal source, the main channel having a source signal component and an interference signal component;

generating at least one reference channel, each reference channel representing signals received in directions other than that of the signal source;

filtering said at least one reference channel using filter weight values to generate a cancelling signal approximating the interference signal component in the main channel;

generating a digital output signal by subtracting the cancelling signal from the main channel;

converting the digital output signal to analog form;

deriving new filter weight values so that the difference between the main channel and the cancelling signal is minimized; and constraining the new filter weight values by converting the new filter weight values to frequency representation values, truncating the frequency representation values to predetermined threshold values, and converting them back to filter weight values.

13. The method of claim 12 wherein constraining the new filter weight values comprises:

generating frequency representation values of the new filter weight values;

divide the frequency representation values into a plurality of frequency bins;

truncating the frequency representation values in each frequency bin if they exceed a predetermined threshold value associated with each frequency bin; and converting the frequency representation values back to filter weight values.

14. The method of claim 13 wherein generating frequency representation values is done by using the Fast Fourier Transform, and converting them back to filter weight values is done by using the Inverse Fast Fourier Transform.

15. The method of claim 12, further comprising the step of filtering said least one reference channel so that it has a substantially flat frequency spectrum.

16. The method of claim 12, further comprising the step of inhibiting the generation of the cancelling signal when a normalized power difference between the main channel and said at least one reference channel is positive.

* * * * *